(12) United States Patent
Heung

(10) Patent No.: US 6,432,174 B1
(45) Date of Patent: Aug. 13, 2002

(54) INDUCED NATURAL CONVECTION THERMAL CYCLING DEVICE

(75) Inventor: Leung Kit Heung, Aiken, SC (US)

(73) Assignee: Westinghouse Savannah River, Aiken, SC (US)

( * ) Notice: Subject to any disclaimer, the term of this patent is extended or adjusted under 35 U.S.C. 154(b) by 61 days.

(21) Appl. No.: 09/711,390

(22) Filed: Nov. 13, 2000

(51) Int. Cl.⁷ .............................................. B01D 59/16
(52) U.S. Cl. ............................................. 95/289; 96/221
(58) Field of Search .......................... 95/87, 288, 289; 96/101, 221

(56) References Cited

U.S. PATENT DOCUMENTS

| | | | |
|---|---|---|---|
| 2,158,238 A | * | 5/1939 | Hvid |
| 2,258,594 A | * | 10/1941 | Brewer et al. |
| 2,585,244 A | * | 2/1952 | Hanson |
| 2,688,404 A | * | 9/1954 | Wahl |
| 3,337,051 A | * | 8/1967 | Kerschner et al. |
| 4,133,762 A | | 1/1979 | Visceglia et al. |
| 4,336,226 A | | 6/1982 | Christensen |
| 4,702,903 A | | 10/1987 | Keefer |
| 4,758,721 A | | 7/1988 | Hill |
| 4,816,046 A | * | 3/1989 | Maeba et al. |
| 4,859,427 A | | 8/1989 | Konishi et al. |
| 5,086,225 A | | 2/1992 | Hill |
| 5,122,163 A | | 6/1992 | Ide et al. |
| 5,312,597 A | | 5/1994 | Heung |
| 5,505,829 A | | 4/1996 | Villa-Aleman |
| 5,993,516 A | | 11/1999 | Morris et al. |
| 6,332,914 B1 | * | 12/2001 | Lee |

\* cited by examiner

Primary Examiner—Duane S. Smith
(74) Attorney, Agent, or Firm—J. Herbert O'Toole; Nexsen Pruet Jacobs & Pollard, LLC

(57) ABSTRACT

A device for separating gases, especially isotopes, by thermal cycling of a separation column using a pressure vessel mounted vertically and having baffled sources for cold and heat. Coils at the top are cooled with a fluid such as liquid nitrogen. Coils at the bottom are either electrical resistance coils or a tubular heat exchange. The sources are shrouded with an insulated "top hat" and simultaneously opened and closed at the outlets to cool or heat the separation column. Alternatively, the sources for cold and heat are mounted separately outside the vessel and an external loop is provided for each circuit.

15 Claims, 2 Drawing Sheets

INDUCED NATURAL CONVECTION THERMAL CYCLING DEVICE

BACKGROUND OF THE INVENTION

1. Field of the Invention

This invention is directed to a method and an apparatus for the separation of gases by thermal cycling of a separation column. The method is accomplished with improved rapidity of cycling and without the necessity for pumps, blowers, and other mechanical means to effect heat transfer.

2. Background and Prior Art

The separation of isotopes has a long and frustrating history. Unlike other chemical separations isotopes show minimal differences in reactivity toward other chemical entities. Diffusion separators and centrifugal separators have been demonstrated to be highly effective but their costs are prohibitive except for highly visible nuclear power and/or military projects.

The separation of element number 1 into its three isotopes, $^1$H(protium or H), $^2$H(deuterium or D), and $^3$H(tritium or T) is important for studies in chemical kinetics and in medicine. The chemical properties of H, D, and T are essentially the same except for weight and equilibrium constants. The separation is made more difficult by the fact that the elements are normally found as the diatomic molecule and may exist in six different possible relationships.

Certain metal hydrides have been used for the storage of hydrogen and for the separation of the H, D, and T isotopes and these metals include vanadium, palladium, and uranium. U.S. Pat. No. 3,711,601 to Reilly et al. discloses a process for the use of vanadium hydride to concentrate and recover heavy hydrogen isotopes. U.S. Pat. No. 4,336,226 discloses a vanadium hydride gas generator to provide a D, T gas mixture in a pressurized chamber wherein the pressure is controlled by regulating the temperature of the high-pressure chamber.

U.S. Pat. No. 5,122,163 to Ide et al. discloses a method for isotope separation of gaseous isotopes in a thermal diffusion column having a hot wall and a cold wall.

U.S. Pat. No. 4,702,903 to Keefer discloses separating components of a gas mixture by thermal swing adsorption and/or pressure swing adsorption inside a Stirling cycle apparatus and absorbent bed.

U.S. Pat. Nos. 4,758,721 and 5,086,225 to Hill discloses isotope separation using thermal cycling in the context of a mass spectrometer. The objective is the concentration of iodine-123 for medical uses.

U.S. Pat. No. 4,859,427 to Konishi et al. discloses hydride-containing columns arranged in parallel within a sealed housing wherein heat is supplied by applying an electric current to heating coils within the housing. The reference attempts to address the problem of changes in the mechanical strength of the metal hydride as a result of generation of hydrogen gas by introducing a series of filters to maintain the integrity of the column.

U.S. Pat. No. 5,312,597 to Heung discloses an apparatus for separating and recovering hydrogen isotopes using a coil in a cylindrical housing as the separation column and externally supplied heating or cooling gases which alternatively heat and cool the column. The invention is particularly characterized by the use of an internal baffle to minimize the mass of the heating/cooling gas for a more rapid cycle time.

U.S. Pat. No. 5,505,829 to Villa-Aleman discloses an apparatus for the separation of the gaseous isotopes H, D, and T using molecular sieves. The apparatus is jacketed for cooling and the temperature of the mol sieves is cycled using microwave energy.

The efficiency of any process using thermal cycling or "thermal swing adsorption" depends upon the rate at which the temperature can be raised and lowered to the optimal upper and lower operating temperatures. The prior art is characterized by low switching rates and by cumbersome supporting equipment and improvement has been long sought without success.

BRIEF SUMMARY OF THE INVENTION

It is an object of this invention to improve the throughput of isotopic generators for H, D, and T. It is a further object of this invention to provide a method for maximizing the rate of isotopic separation at the lowest energy requirement. It is yet a further objective of this invention to provide a means for isotopic separation which requires a minimum amount of maintenance.

These and other objectives may be achieved by enclosing a separation column within a pressurized vessel containing a heating coil, a cooling coil, each of which may be enclosed separately in a structure which is insulated, valved to prevent backflow, and readily switched on and off.

DETAILED DESCRIPTION OF THE INVENTION

Figure 1:
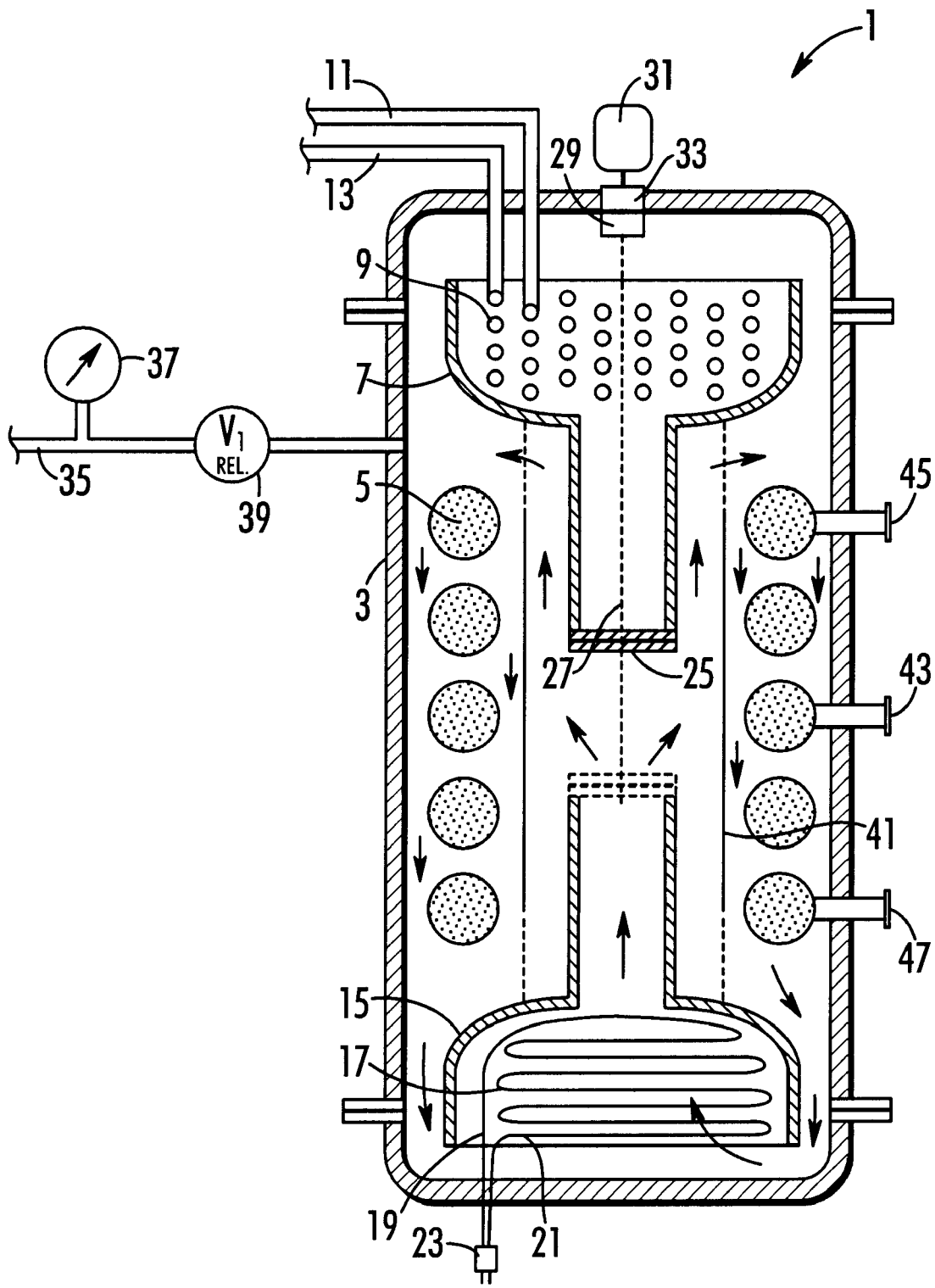
FIG. 1 illustrates the components of the invention in a first embodiment thereof.

The device for the operation of the claimed method consists of a vessel containing a separation column and means for alternatively heating and cooling a fluid within the vessel. Within the column may be found a suitable packing such as a metal hydride for H, D, and T separation. The column is preferably circularly wrapped according to conventional configurations in gas and liquid chromatographs. The column is inserted into a vessel containing a fluid. At one end of the vessel is a cooling element which is preferably disposed at the top of the vessel and at the opposite end is a heating element which is preferably at the bottom of the vessel. The cycling procedure entails the alternate use of the cooling means and the heating means to cycle the temperature of the enclosed fluid. Efficiency is enhanced by isolating the cooling and heating means. An insulated baffle is employed which partially encloses the cooling and heating elements and may be opened and closed by mechanical or electrical means to effectively seal off a heating or cooling means when the opposite means is being employed. Alternatively, the heating and cooling means may be in appendages to the vessel and isolated by valves. Each heating and each cooling means is connected to an outside source of heat or cold and typically entails an inlet and an outlet. At least one inlet and at least one outlet connect the separation column with the exterior of the device.

The pressure vessel may be formed from a ferrous or a non-ferrous metal with a strength sufficient to withstand the pressure created by the cooling and heating of the fluid within. Given the temperature fluctuations, it may be preferred to insulate the vessel. More expensive materials such as carbon fiber reinforced plastics may be used which are inherently insulating. In the interest of safety, a pressure gauge may be used, preferably in conjunction with an inlet pipe for the contained fluid and a pressure relief valve.

The cooling means is preferably a tubular coil within which is circulated a fluid with a very low freezing point. Liquid nitrogen is preferred in consideration of its cost and availability and because its reactivity and toxicity are low. Cryogenic liquids such as liquid nitrogen may be introduced in the liquid form and circulated within a heat exchanger in the pressure vessel. Ammonia also may be used according to known methodology.

Transfer liquids may also be used. In such a system, the, transfer liquid would be cooled using a cryogenic gas or liquid or by a low temperature refrigeration unit and the transfer fluid pumped through the heat exchanger. Certain chlorofluorocarbons as may be legally available may be used for such a process. Transfer fluids must be selected and used so that they do not freeze but have the advantage that they are less likely than cryogenic liquids to be evaporated in the heat exchanger. They are also helpful in reducing thermal shock to the heat exchanger during routine cycling.

The heating means may be a simple resistance electrical heater under which circumstances the inlet and outlet become the two wires carrying the current. The heating element may be a suitable strong, naked wire or may be a conventional heating element in which the wire is embedded or wrapped around a ceramic insulator and encased in a metallic or ceramic sheathing. Alternatively, the heat exchanger may receive a heated fluid from an external heating source. In such circumstances, a variety of synthetic hydrocarbon and silicone oil substances are available. The external heater may be electrically heated gas or oil fired, heated by a microwave power source or a laser source.

The heat exchanger may be in the form of simple coils, in the form of one or more metal plates having passageways formed therein or in the form of a radiator employing fins to maximize the surface area. The material used is not necessarily limited except that it must not be reactive with either the material used to transfer heat or cold liquids and non-reactive with the fluid contained within the pressure vessel. The material must not be shock sensitive and must withstand pressure changes. Both ceramics and ferrous and non-ferrous metal alloys are suitable. Good heat conductive materials such as alloys containing copper and aluminium are preferred for heat transfer. Minimal wall section consistent with the pressure requirements are preferred for both thermal shock and heat transfer reasons. Internal baffling may be used to improve strength and heat transfer provided that the baffles induce a minimal amount of hydraulic drag and avoid vapor lock. When using a cryogenic gas such as liquid nitrogen, it is preferred that the material vaporize along the flow path. Diameters must be sized appropriately to minimize back pressure. Proper monitoring of the conditions of the exhaust temperature and pressure may be used to adjust the rate of inflow.

The high temperature heat exchanger is subject to similar design considerations as the low temperature exchanger. Non-corrosivity and efficiency of exchange are paramount and resistance to thermal shock also is critical. Pressure shock is less of a problem because the heat transfer means may be maintained under pressure at all times. Choice of the appropriate transfer fluid must take into consideration these viscosity changes during the cooling cycle to avoid congealing the fluid when the heat source is disconnected. An external heat source is preferred to avoid this problem. Flow control of a transfer fluid is preferred to cycling of the heat source in response to the switching rate in the device. If a simple electrical heater is to be used, careful choice of voltages and heating elements warrant consideration.

The fluid within the pressure vessel must be inert with respect to the surfaces within the vessel. The fluid should not condense on the cold side heat exchanger lest transfer efficiency be greatly compromised and the heating cycle be prolonged to evaporate the liquid. Gases, particularly inert gases, are preferred.

One difficulty in using a gas as heat transfer means is its low density. Increasing the molecular weight increases the density of the gas, hence its heat capacity but that results typically in increased condensibility and, in some cases, cost. Increasing the pressure within the vessel can dramatically increase the number of molecules present and the heat transfer capabilities of the gas with concomitant strain on the pressure vessel, the separation coil and the heat exchangers. The cost and complexity of the device becomes a function of the pressures under which the device is operated to obtain the switching frequency which is desired. A pressure of 150 psig (10 bar) is preferred. Because of the temperature swings, maximum efficiency requires a pressure relief or accumulator.

As illustrated in FIG. 1, the device 1 is contained in a pressure vessel 3. Wrapped within the pressure vessel is the separation column 5, having at least one inlet 43 and at least one outlet 45. A second outlet 47 is present in the preferred configuration. The separation column 5 is held in position by the inlet and outlet pipes.

At the top of the device is an inverted top hat or funnel 7 formed from a thermal insulator such as glass or ceramic fibers with metal backings. The funnel 7 is held in place by brackets (not shown) which attach to the wall of the pressure vessel. Within the top portion of the funnel is a coil 9 for circulating a heat transfer material serving as a cooling means. The coil ends in an inlet 11 and outlet 13 respectively.

The coil 9 is preferably a metal for good heat transfer and thermal shock resistance and may be finned externally to increase surface area. The wall thickness of the coil should be sufficient to prevent deformation under the operating pressures within the coil and pressure vessel. A pressure regulator may be used to control flow rate of the nitrogen.

At the bottom of the device a top hat or inverted funnel 15 formed from an insulating material such as that used for funnel 7 encloses a heating coil 17. The heating coil 17 may be an electrical resistance heater or a coiled tube through which flows a transfer fluid. A heat source inlet 19 and heat source outlet 21 may be opposite sides of a coiled wire or pipes analogous to cold fluid inlet and outlet 11 and 13. If the heat is electric, a plug 23 may be used.

Flow guides 41 are stood off from the insulators 7 and 15 to channelize the flow of hot or cold transfer fluid to enhance the momentum of the fluid flow. The guides 41 may be an insulator or may be a metal such as stainless steel or aluminum or a ceramic. Low heat capacity is preferred to remove ballast from the system during cycling.

The device cycles by operation of a control gate 25. The gate alternately opens the mouths of the hot and cold funnels to allow transfer fluid to circulate over the hot and cold coils and over the separation column 5. As shown in FIG. 1, gate 25 is a disc controlled by a threaded shaft 27 driven by a gate control 31 such as an electric motor through a packing gland 33. The gate travels between the two funnels 7 and 15, alternately opening one end and closing the other. The gate should be made of a material which accomodates thermal shock over repeated cycles and which has a low mass. A cage may be used to keep from rotating and to align and hold funnels in place.

Alternative gate systems are easily envisioned. Caged ball systems with magnetic control, reed valves, poppet type valves, irises are useable alternatives using a control device indicated as element 29.

The internal heat transfer medium is introduced through an inlet pipe 35, to which is preferably attached a pressure gauge 37 and a pop-off relief valve 39 which may be either a spring loaded valve or a frangible disc. A spring loaded pop off controls pressure better since it allows the mass within the pressure vessel to be increased during cooling, albeit at some cost for lost transfer gas. An accumulator is an alternative.

In operation, a predetermined amount of the mixture of isotopes or gasses is loaded onto column 5 through inlet 43, while the gate is open with respect to the cold source and closed with respect to the heat source, which is preferably turned off while cold fluid is flowed in coil 9. The less absorbed gas travels to the ends of the column and is withdrawn from the ends as product number 1. The more absorbed gas stays with the absorbent in the column. The gate is then moved to close with respect to the cold source and open with respect to the heat source. The absorbed gas is now desorbed from the absorbent and is collected from both ends as product number 2. The cycle is repeated.

Figure 2:
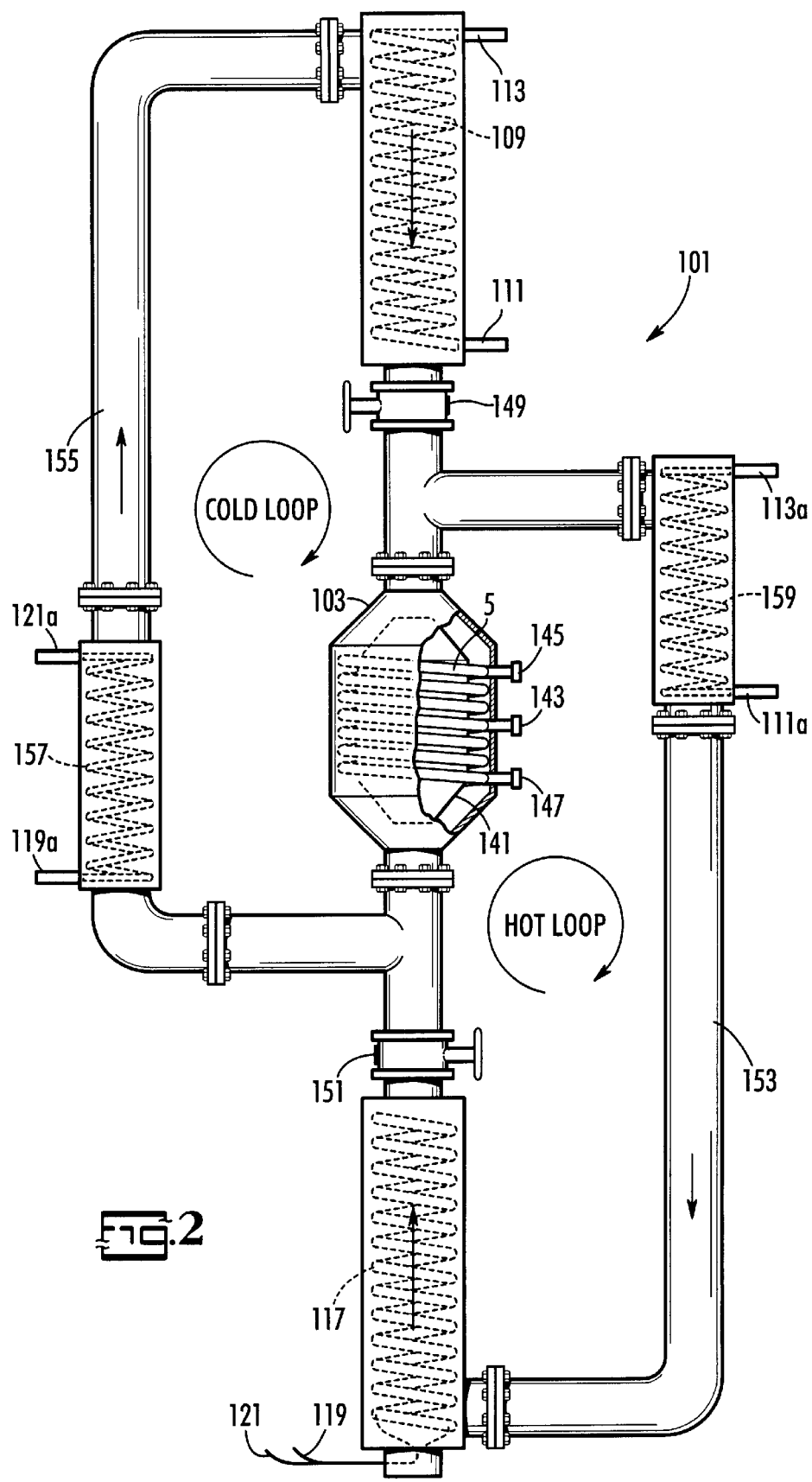
FIG. 2 illustrates an alternative configuration for the device.

An alternative embodiment of the thermal cycling device of this invention is shown in FIG. 2. The device 101 has a pressure vessel 103 wherein the separation column is coiled. Preferably, the separation column is coiled around a baffle 141 as disclosed in U.S. Pat. No. 5,312,597 so as to reduce the volume of fluid within the pressure vessel and reduce the mass which serves as a heat sink.

In this embodiment, the cooling and heating means are disposed outside the pressure vessel body. As shown, the cooling means 109 consists of a tubular pipe section wherein the tubular coil, which serves as the heat exchanger, is located. An inlet 111 for cold fluid, typically liquid nitrogen, is located at the bottom side of the coil box 109 and an outlet 113 is located at the opposite end.

The heating means is located in a tubular pipe section 117, and consists of a coiled heat exchanger having an inlet 119 and outlet 121. As in the first embodiment, these may be the ends of a resistance heater.

This embodiment is characterized by the use of two control gates 149 and 151, which are mechanical valves such as butterfly valves, and by the presence of two distinct pathways for the circulation of the heat transfer means. A hot side recirculating loop 153 connects the top of pressure vessel 103 to the bottom of the hot side coil box 117. A cold side recirculating loop 155 connects the bottom of pressure vessel 103 to the top of the cold side coil box 109.

In operations, when valve 149 is open and valve 151 is closed, the heat transfer means circulates in a loop formed by pressure vessel 103, recirculating loop 155 and cold side coil box 109. At this time, isotopic mixture may be loaded at inlet 143 and the first product may be withdrawn. When valve 149 is closed and valve 151 is opened, the heat transfer means flows from hot side coil box 117 through pressure vessel 103 and returns through recirculating loop 153. At this time, concentrated isotopes may be withdrawn at outlets 145 and 147.

The materials for construction of the embodiment shown in FIG. 2 are similar to those required for the embodiment of FIG. 1 because in both cases, the system operates at a maximum pressure of about 150 psig. (approximately 10 bar). Stainless steel wrapped in insulation is preferred. For ease of assembly and maintenance, the vessel may be formed of two or three sections which are bolted together at flanged surface.

In the embodiment shown in FIG. 2, the recirculating loops have a booster or jockey pump in the form of a heating coil 157 at the bottom of the cool loop 155 and a cooling coil 159 at the top of the hot loop 153 with heat supplied by inlet 119*a* and outlet 121*a* and cold by 111*a* and 113*a*.

The invention has been described in light of a preferred embodiment. Modifications which are apparent to those with skill in the art are include within the scope and spirit of this invention.

I claim:

1. An induced natural convection thermal cycling device comprising:
   1) an upright pressure vessel;
   2) a cooling means in a top portion of said vessel, said means having an inlet and an outlet;
   3) an insulation shield around said cooling means, open at the top thereof and having a tubular projection downward from said means;
   4) a heating means in a bottom portion of said vessel, said means having an inlet and an outlet;
   5) an insulating shield around said heating means, open at the bottom and having a tubular projection upward from said heating means;
   6) means for simultaneously opening and closing the tubular projections;
   7) a separation column having at least one inlet and one outlet wrapped spirally around said tubular projections.

2. An induced natural convection thermal cycling device according to claim 1 further comprising one or more baffles between said tubular projections and said separation column.

3. An induced natural convection thermal cycling device according to claim 1 wherein said means for simultaneously opening and closing the tubular projections is a gate which shuttles between the tubular projections.

4. An induced natural convection thermal cycling device according to claim 1 wherein said means for simultaneously opening and closing the tubular projection is a pair of valves.

5. An induced natural convection thermal cycling device according to claim 1 further comprising means for maintaining a pressure of an inert gas within said pressure vessel.

6. An induced natural convection thermal cycling device according to claim 1 wherein said cooling means is a tubular metal coil.

7. An induced natural convection thermal cycling device according to claim 6 wherein said tubular metal coil is cooled by flowing liquid nitrogen through the coil.

8. An induced natural convection thermal cycling device according to claim 6 wherein said cooling coil is cooled by flowing a transfer fluid through the coil.

9. An induced natural convection thermal cycling device according to claim 1 wherein said heating means is an electrical resistance heating coil.

10. An induced natural convection thermal cycling device according to claim 1 wherein said heating means is a tubular metallic coil.

11. An induced natural convection thermal cycling device according to claim 10 wherein said tubular metallic coil is heated by flowing a transfer fluid through the coil.

12. An induced natural convection thermal cycling device according to claim 11 wherein said transfer fluid is a silicone oil.

13. A method for separation of gasses by thermal cycling of a separation column wherein a cold source and a heat source are present outside the top and bottom respectively of a pressure vessel containing a separation column and the cold and heat sources are turned on and off simultaneously.

14. A method for separation of gasses according to claim 13 wherein circulation of heated and cooled gasses occurs in part in a loop outside the pressure vessel and heat and cold sources.

15. A method for separation of gasses according to claim 14 further comprising a thermal booster pump in said loop.

* * * * *